United States Patent [19]

Karchevski

[11] 4,404,675
[45] Sep. 13, 1983

[54] FRAME DETECTION AND SYNCHRONIZATION SYSTEM FOR HIGH SPEED DIGITAL TRANSMISSION SYSTEMS

[75] Inventor: Robert A. Karchevski, San Mateo, Calif.

[73] Assignee: GTE Automatic Electric Incorporated, Northlake, Ill.

[21] Appl. No.: 258,192

[22] Filed: Apr. 27, 1981

[51] Int. Cl.³ .............................................. H04J 3/06
[52] U.S. Cl. .................................... 371/47; 375/116
[58] Field of Search .................... 375/114, 116, 106; 371/47, 42, 46, 57, 5; 370/106, 105, 100

[56] References Cited

U.S. PATENT DOCUMENTS 3,903,371 9/1975 Colton et al. ..................... 370/105
4,135,060 1/1979 Heckel et al. ..................... 370/105 X Primary Examiner—Robert L. Griffin
Assistant Examiner—Albert W. Watkins
Attorney, Agent, or Firm—Leonard R. Cool

[57] ABSTRACT

Incoming data in binary form is retimed, and under control of a framing clock, a first counter clocks in four bits in the first stage of a preview store; and a second counter clocks in eight bits, four bits in each of the second and third stage of the preview store. The first bit in each instance is the framing bit for the next previous frame location and the second next previous frame location so long as an in-frame condition exists, and the frame control is in synchronism with the framing bits contained in the incoming data.

The current data bit is compared with the bits appearing at the output of the first and second stages of the preview store to determine if the three bits comprise a valid framing sequence for a non-winking framing sequence in which any combination of the following frame bit indications may occur-F1 F0 F0 F1-where the number following the F indicates the state of the framing bit. If they do, the counters shift the four and eight bits as noted above to establish the condition necessary for comparison with the next incoming framing bit. Although the current data bit will constantly change with the character of the data, false error indications are prevented by use of a coincident circuit with the comparator output and a delayed frame clock signal.

If framing errors occur, these are passed through the coincident circuit to an error density detector. If the error rate exceeds a predetermined value, the state of the output signal from the error density detector is changed. The counters respond to this condition by stepping the stored bits through the registers of the preview store one bit at a time and, of course, a comparison is made at each step and, if a valid sequence is detected, the output of the detector is applied to the counter to halt the stepping sequence. Then the counters read in the four and eight bits of data which data is then held for comparison at the next framing bit location. If the in-frame condition obtains, this sequence is repeated at each frame bit occurrence. If not, the search mode will again exist and the stepping sequence will be repeated.

3 Claims, 4 Drawing Figures

FRAME DETECTION AND SYNCHRONIZATION SYSTEM FOR HIGH SPEED DIGITAL TRANSMISSION SYSTEMS

BACKGROUND OF INVENTION

1. Field of Invention

This invention relates to framing synchronization in digital transmission systems and, in particular, to a novel technique of frame error detection and search control which allows a comparison of up to n bits on the occurrence of each framing clock pulse while an out-of-frame condition exists in a system which does not employ alternating framing bit sequences.

2. BACKGROUND DESCRIPTION

Most systems which have addressed the problem of reframing upon loss of synchronization have been concerned with framing patterns in which the framing pattern has been "winking", i.e., at the frame bit location the framing bit will alternately be a binary "1" and then a binary "0". One such system which employs an eight bit store and a frame control is described in U.S. Pat. No. 3,742,139, entitled "Framing System for T-Carrier Telephony," inventor M. A. Baehley. In this framing system, a group of eight bits are arbitrarily selected in a first frame and are fed to the store and compared with the corresponding time slots two frames later. Thus, the eight bits of the first frame are compared with the bits in the same time slot of the third frame, the third frame with the fifth, the fifth with the seventh and the seventh with the ninth, in each case with corresponding time slots. If framing is not achieved after the comparison between the seventh and ninth frames, the frame control circuit operates to delay the opening of the store by eight time slots, another series of comparisons is carried out, this time directed to a series of eight time slots immediately following the eight time slots in the first comparison. The process is repeated until framing is achieved.

Disadvantages of that technique include the circuit complexity and the necessity to wait through four frames before the frame shifting is initiated. An improved frame search control for a digital transmission system was disclosed in U.S. Pat. No. 4,203,003, issued May 13, 1980, for an invention entitled "Frame Search Control for Digital Transmission System," inventor Ralph L. Kline.

This technique was designed for use with a "winking" framing pattern, i.e., 101010 etc., rather than the more complex framing pattern of F1 F0 F0 F1 employed with the instant invention. Also, the monitor and search techniques of the instant invention were designed to respond more quickly as in desirable for use with a higher speed pulse train.

SUMMARY OF INVENTION

In a receiver for recovering digital information from an incoming serial bit stream containing information bits and framing bits, a framing detector and frame synchronization arrangement includes a preview store having a plurality of stages each capable of storing a like number of bits, and timing means, synchronized with the incoming binary data, for clocking into each stage of the store, on the occurrence of each framing bit, said like number of bits. The current bit of the incoming data and the outputs from the preview store are applied to a comparator to determine if the bits present constitute a valid framing sequence for a non-winking framing bit pattern. If they do, the timing means causes another like number of bits to be shifted into the register for comparison with the next framing bit. If the comparator detects a number of framing errors, an error density detector will provide an output signal which, in conjunction with the comparator output, will cause the preview store to step one bit at a time to determine if a valid framing sequence can be located in the stored bits. If no valid sequence is found in the like number of bits, the timing means will shift in another like sequence of bits for comparison with the framing bit at the next anticipated frame bit location.

DETAILED DESCRIPTION OF INVENTION

Figure 1:
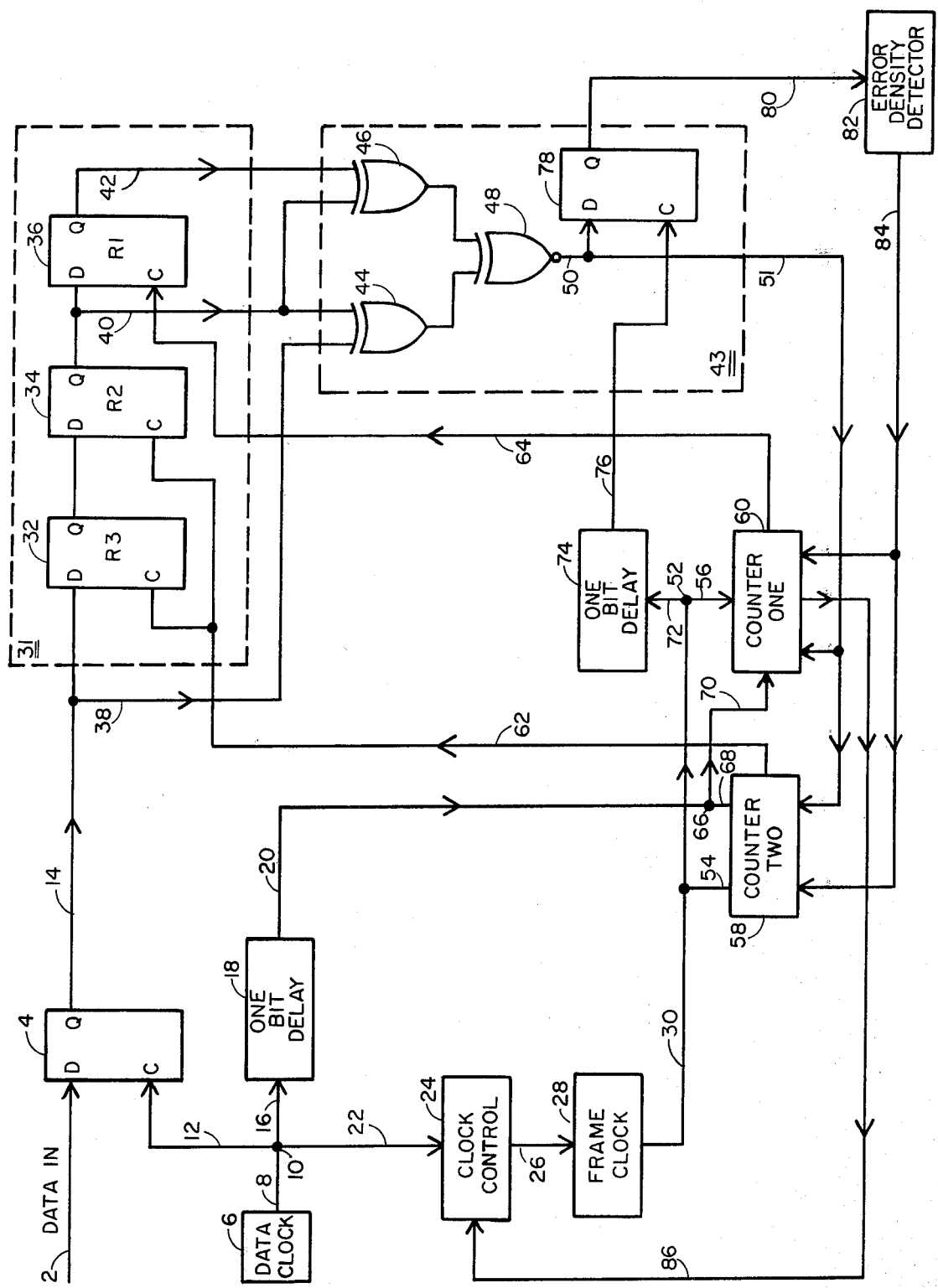
FIG. 1 is a block diagram of the frame detection and synchronization system of a preferred embodiment of the invention.

Referring now to FIG. 1, it may be seen that the recovered binary data is applied on the path 2 to the D input of a retiming flip-flop 4. A data clock 6 is synchronized with the incoming data on path 2 and may in fact be recovered therefrom, as is well known. The data clock output on path 8 is applied via junction 10 and path 12 to the clock input of retiming flip-flop 4 so that the retimed data is applied from the Q-output via path 14 to preview store 31, and via path 38 to the comparator 43.

Figure 3:
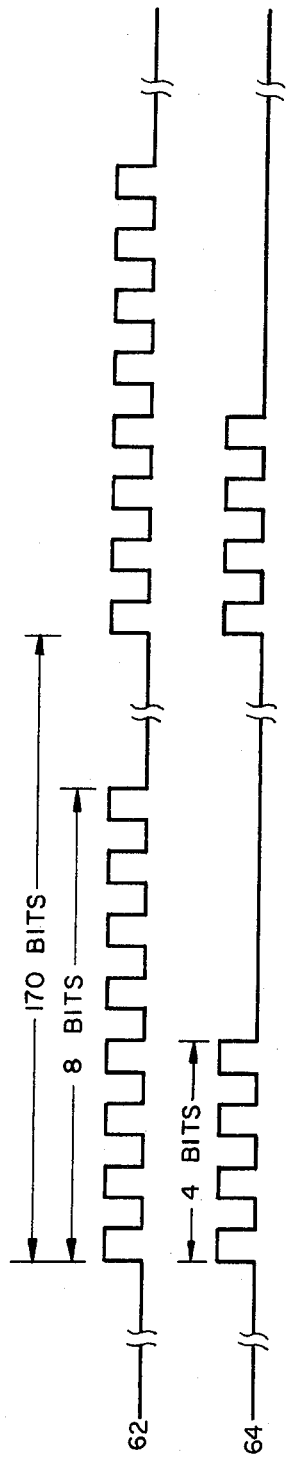
FIG. 3 is a waveform diagram showing the clocking pattern of counter 2 and counter 1 for storage of four bits each in each of the three registers of the preview store and for a framing bit interval which is equal to 170 bits of the incoming binary serial bit stream.

The data clock output on path 8 junction 10 is applied via path 22 to clock control 24 which control may be interrupted by an output on path 86 from counter one 60, as will be disclosed in more detail hereinafter. The data clock output from clock control 24 is applied via path 26 to frame clock 28 in which the data clock is divided to obtain a pulse output on path 30 which has the same periodicity as the frame interval of the framing pattern. This frame clock pulse is applied via junction 52, path 54 and 56 to an input of counter two 58 and counter one 60, respectively. The frame clock is also applied via path 72, one bit delay 74 and path 76 to the clock input of coincidence flip-flop 78. The one bit delay of 74 is at the same bit rate as the data clock input. As will be described in more detail later with respect to counter one in particular, counters one and two shift into the registers of the preview store 31 four bits and eight bits, respectively. Referring again to FIG. 1, it may be seen that the counter two output on path 62 is applied to the clock input of both registers 32 and 34. Referring now to FIG. 3, it may be seen that at the framing bit interval, counter two provides at path 62 an eight bit clocking pulse and thus at each framing interval will shift eight data bits into the registers 32 and 34. Counter one provides a four bit clocking interval as shown in FIG. 3 so that a burst of four data bits will be read into storage register 36. Both bursts start at the same time. The data input signal is loaded into registers 32 and 34 starting with an F-bit, assuming that the framing pattern is correct and that the framing circuit is in sychronism with the incoming data. At the next frame bit location, which will occur 162 time slots after the eight digit burst into registers 32 and 34, the next F-bit is loaded into registers 32 and 34 along with the next following seven consecutive data bits. At the same time, the previous F-bit and the three following data bits are shifted from register 34 into register 36 by the burst of four pulses from counter one applied via path 64 to the clock input. Now as the third F-bit appears on path 14, there will be three consecutive F-bits present in the circuit. The first at the Q-output of retiming flip-flop 4 which is applied along path 14 to the D-input of register 32 and also via path 38 to one input of exclusive-OR gate 44. The second F-bit will at the Q-output of register 34 and will be applied not only to the D-input of register 36 but along path 40 to the other input of exclusive-OR gate 44 and one input of exclusive-OR gate 46. The third F-bit will appear at the Q-output of register 36 and will be applied along path 42 to the other input of exclusive-OR gate 46.

Figure 4:
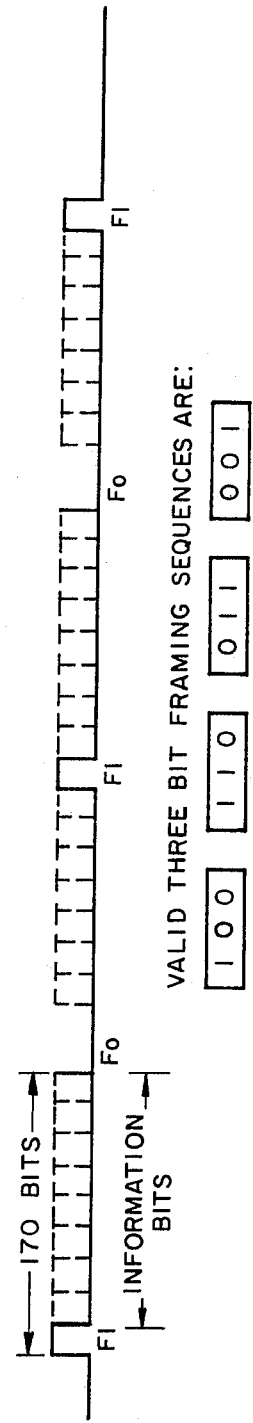
FIG. 4 illustrates the framing bit pattern which is used with the preferred embodiment of the invention.

Referring now to FIG. 4, it is readily seen that the following valid framing sequences may occur in the three bit positions as described above. These are: 100; 110; 011; and 001. Any other sequences which would appear would be invalid and should cause an error signal. Thus if any one of these four patterns are present, this is a valid F-bit pattern and the output of gate 48, FIG. 1, is a logic low. Any one of the four invalid patterns being present, i.e., 010, 101, 000, 111, would result in a logic 1 output from gate 48 which then appears on path 50 and is applied to the D-input of coincidence flip-flop 78 and via path 51 to an input to each of the counters counter one and counter two. It is to be noted that the gate 48 output is valid only during the one time slot, i.e., that which appears at the third F-bit location on path 14; and not the subsequent data bits which will also appear there. Thus the function of the one bit delay for the frame clock is to provide a clock input to flip-flop 78 at the frame bit interval and thus read the output of gate 48 into the error density detector via path 80. Flip-flop 78 also holds the value of the output of gate 48 until 169 time slots later when the next comparison is clocked into flip-flop 78.

Even though an occasional error will be evidenced by the comparator and is read through coincidence flip-flop 78 and path 80 to the input of error density detector 82, there will not be an error signal output on path 84 until the number of errors in a predetermined time interval exceeds a predetermined number. Thus the condition of the frame detection and synchronization circuit could be considered to be in a monitor mode in that it is simply monitoring the incoming data to determine that valid framing sequences exist. Once the framing sequences are no longer valid and remain so for a period of time in excess of said predetermined interval, the error density detector will then provide an output signal on path 84 which is applied to counters one and two to inaugurate the search mode. When this error signal appears then the counters one and two control the number of pulses in the bursts used to load the shift registers and initially cause the shift registers to step one bit at a time so that a comparison can be made with the next bit appearing in the data path 14. Should this be a good comparison, the circuit will wait 170 time slots for the next comparison in anticipation of it being the correct F-bit. In the situation just described, the bursts of pulses from counters one and two would have been five and nine pulses long, since one additional pulse was added to each of the counter bursts with the receipt of the initial bad comparison.

for every bad comparison, i.e., invalid framing sequence, the burst of pulses is extended by one pulse. This will continue until a good comparison is made or until a maximum of four bad comparisons are made. Since register 36 can only hold four consecutive bits, if these are all shifted out, the process must stop until the next framing bit location (170 time slots later) so that more bits can be loaded into the preview store.

Figure 2:
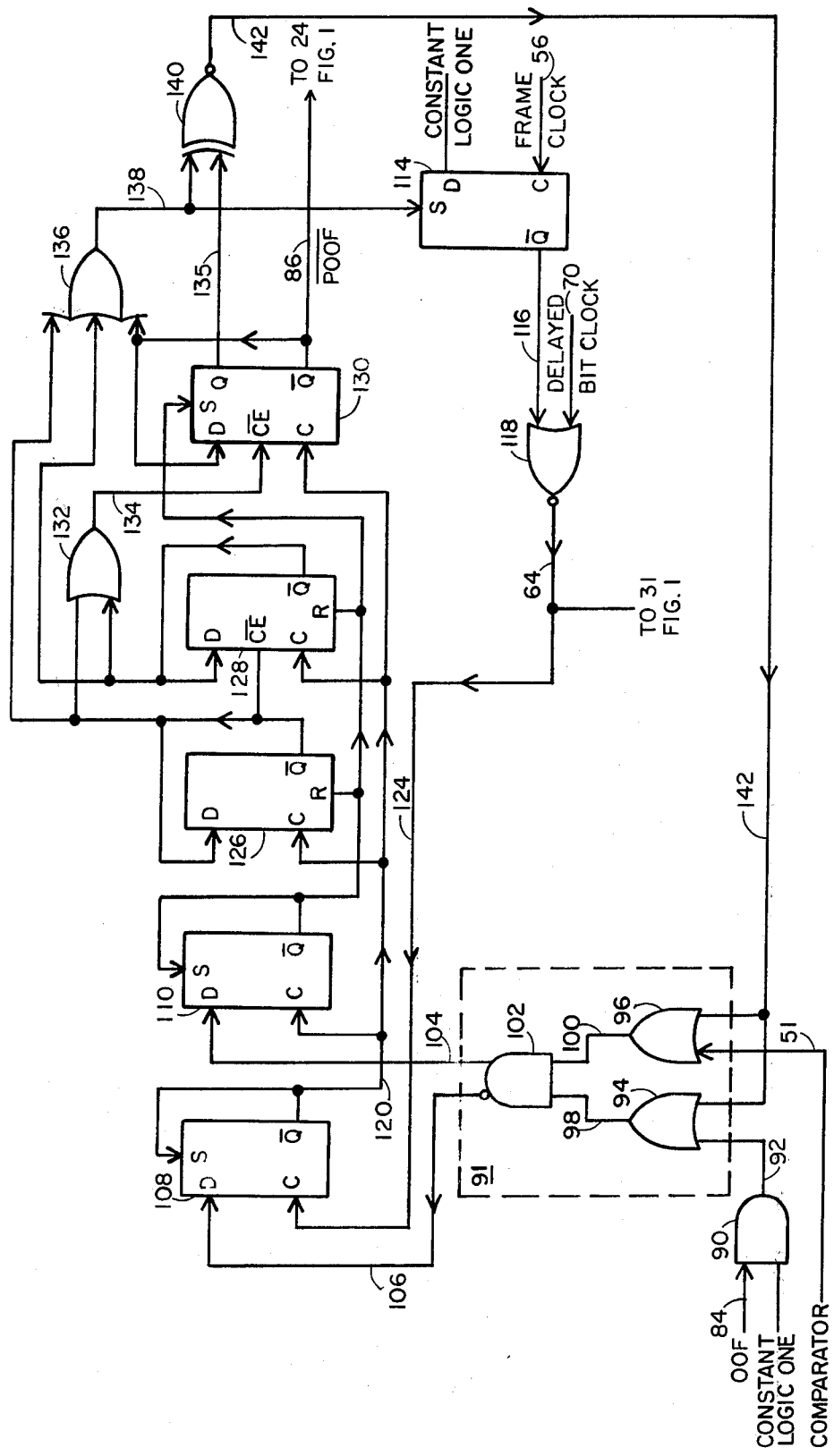
FIG. 2 is a block diagram showing in more detail counter 1 illustrated at (60) of FIG. 1.

How the bursts of pulses are read into the preview store and how the stepping of the pulses during an out-of-frame condition is obtained may be best understood by referring to FIG. 2 in which the circuit for counter one is shown in more detail. This counter is a basic divide by eight counter using three flip-flops 126, 128 and 130, with provision to divide by four depending upon the steering logic. As part of the frame search control circuit, this counter puts out a burst of four pulses during the monitor mode and a burst of four to eight pulses in the search mode. These bursts occur every 170 time slots beginning with the framing bit location. During the monitor mode there is no error signal on path 84 at the output of error density detector 82 and thus the input to AND-gate 90 is low, and this provides a low or binary "0" output on path 92. Assuming for the moment that the output of gate 140 is low, which applies a low input via path 142 to the OR-gates 94 and 96, the output of the OR-AND gate 91 is forced low (path 104) and high (path 106), putting a binary "0" at the D-input of flip-flop 110 and a binary "1" at the D-input of flip-flop 108. Of course, in the monitor mode, the input on path 51 which is the output of the comparator could be either a binary "1" or a binary "0" depending upon the time one would look at this input path. The appearance of the frame clock pulse on path 56 clocks flip-flop 114 so that the $\overline{Q}$ output goes low on path 116 to the input of gate 118. The other input to gate 118 is the delayed clock bit on path 70 which shifts the output of gate 118 rom low to high on the next clock transition. This positive going transition clocks both flip-flops 108 and 110. The $\overline{Q}$ output of flip-flop 110 changes from binary "0" to binary "1", resetting flip-flops 126 and 128 and setting flip-flop 130. The $\overline{Q}$ output going high also sets flip-flop 110 which forces the $\overline{Q}$ output low. Therefore, Q is high for a very short time. Setting flip-flop 130 keeps the Q output at a binary "1". The $\overline{Q}$ outputs of flip-flops 126 and 128 are both binary "1" so that the output of OR-gate 136 is a binary "1". Therefore, the exclusive-NOR gate 140 has like inputs and the output is binary "1", forcing the output on path 104, of the OR-AND circuit 91, to change to a binary "1". Now flip-flop 110 has a binary "1" input and flip-flop 108 has a binary "0" input. Therefore, the next clock pulse that comes through the enabled gate 118 leaves flip-flop 110 unchanged and flip-flop 108 changes its Q output from binary "0" to binary "1". Of course, flip-flop 108 sets itself when the Q output goes high, making the output or clock pulse very narrow. This narrow clock pulse causes the counter to count from four to five. (Remember, flip-flops 126 and 128 are cleared, but flip-flop 130 is set.) The next clock pulse changes the count from five to six, and this continues until a count of seven is reached, at which time all three inputs to OR-gate 136 are zero and now the inputs to the exclusive-NOR gate 140 are unlike so that its output changes to a binary "0" enabling the OR-AND circuit 91. This logic low signal also changes the state of flip-flop 114 so that its output now inhibits gate 118 and thus only four clock pulses are allowed to pass through gate 118. The first clock pulse presets the counter and the next three made it count to seven. With no more clock pulses from the delayed bit clock via gate 118, the entire counter stops until the timing signal from the frame clock clocks flip-flop 114 so as to enable gate 118.

When the error density causes an error signal to appear on path 84 in the form of a binary "1", the OR-AND circuit 91 is enabled so that bit comparisons made in the comparator and F-bit detection circuit 43 and appearing on path 51 pass through OR-AND circuit 91 and are applied to the D-inputs of flip-flops 108 and 110. If the very first comparison is good, as it would be if the circuit were in-frame, the counter operates exactly as described above for the monitor mode. However, if the comparison is bad, flip-flop 108 sends the first pulse and the flip-flops (126, 128 and 130) are clocked rather than reset. Because they are at "all ones" (a count of seven), this clock pulse rolls the counter over to a zero count causing the Q-output of flip-flop 130 to go to binary "0" while the output of gate 136 goes to binary "1", which maintains the output of exclusive-NOR gate 140 at binary "0". Now the next comparison output from the comparator and F-bit detector on path 51 can pass through OR-AND circuit 91. If this is a good comparison, the counter presets to four (due to a zero at the input to flip-flop 110 when the first clock pulse arrives on path 64) and it counts to seven as described above for the monitor mode. Another bad comparison causes it to clock (count) once again. Should there be four bad comparsions in a row, the fourth count does the same as a reset pulse, i.e., it causes the Q-output of flip-flop 130 to go to binary "1" and now the counter is exactly as if it had been preset.

The $\overline{Q}$ output of flip-flop 130 provides a partial-out-of-frame signal (POOF) and it goes to binary "1" if there is a bad comparison during the search mode of operation. While it is high, this signal inhibits the clock control via path 86 (FIG. 1) which normally passes the data clock signal to the frame clock 28. While the cock control is stopped, the frame clock 28 is stopped but the preview store continues to clock data bits through. A good comparison resets counter one thereby enabling the clock control and thus the frame clock so as to ensure that the next comparison will be at the correct framing interval, i.e., 170 time slots. Counter two operates in a similar manner but does not provide the partial-out-of-frame signal on path 86 as does counter one.

While the invention has been particularly shown and described with reference to a preferred embodiment thereof, it will be understood by those skilled in the art that change in form and detail may be made therein without departing from the spirit and scope of the invention.

What is claimed is:

1. In a high speed digital system, a framing detector and frame synchronization arrangement for a framing pattern other than that of a winking framing pattern consisting of alternating binary "1"s and "0"s, comprising:
    a preview store having a plurality of stages each capable of storing a like number of bits;
    timing means synchronized with the incoming binary data for clocking into each stage of said preview store said like number of bits, on the occurrence of each framing bit;
    a comparator for comparing the state of the present incoming data bit with stored outputs from selected stages of said preview store to determine if these bits constitute a valid framing sequence, and providing a binary output of one state for a valid sequence and of the other state otherwise;
    an error density detector for providing an error signal indication when a predetermined error rate is exceeded; and
    counting means adapted to be responsive both to the output signal from said error density detector and to the output signal from said comparator so as to permit either the clocking in of said like number of bits whenever the comparator output indicates that a valid framing sequence exists at a frame interval, or to permit a bit by bit comparison as the bits stored in the preview store are stepped one bit at a time for valid framing sequence comparison, the stepping sequence being stopped by the occurrence of a valid frame sequence as determined by the output of said comparator, or by stepping through said like number of bits, whichever occurs first; should the latter occur, the timing means reads into said preview store a like number of bits for comparison with the bit at the next frame bit location.

2. The arrangement in claim 1 wherein said timing means comprises:
    a data clock providing at an output a binary signal at the bit rate of the incoming data and in synchronism therewith;
    a clock control circuit having one input connected to the output of said data clock, having a control input terminal, and providing said data clock binary signal at an output;
    a first one bit delay at the data clock rate for providing a delayed data clock signal at an output;
    a framing clock having an input connected to the output of said clock control circuit and providing at an output a framing pulse which occurs at the framing pulse rate; and
    a second one bit delay at the data rate having an input connected to the output of said frame clock.

3. In the receiver of a pulse transmission system, apparatus for detecting the presence or absence of an in-frame condition for a framing pattern other than that of a winking framing pattern consisting of alternating "1"s and "0"s, monitoring the framing pattern when an in-frame condition exists, converting to a search mode when the error density exceeds a predetermined value and recognizing an in-frame condition has been subsequently obtained, comprising:
    timing means providing a pulse rate which is equal to the pulse repetition rate of the binary data input;
    a timing control circuit responsive to said timing means for providing at one output a first timing signal having a pulse repetition rate of said framing pattern and at another output a second timing signal having the same pulse repetition rate as said first timing signal but delayed by one bit interval;
    a preview store having a plurality of stages and having an input adapted to receive said data, having first and second clock inputs and having first and second outputs;
    a first counter responsive to the first timing signal to shift into a first stage of said preview store a first predetermined number of bits;
    a second counter responsive to said first timing signal for shifting into second and third stages of said preview store a second predetermined number of bits, which is more than said first predetermined number;

a comparator having a first input adapted to receive said data, a second input connected to a first output of said preview store, a third input connected to a second output of said preview store and providing one binary state at an output when the three inputs are indicative of a valid framing pattern and the other binary state at said output otherwise;

a coincident circuit responsive to said second timing signal and the output of said comparator to ensure that a frame error is identified with the framing bit location in the pulse train;

an error density detector which is responsive to the error occurrences from said coincident circuit to register same and if a sufficient number occur during a predetermined time period to provide at an output a binary indication of that fact;

means responsive to said binary indication and to the output of said comparator to cause said first and second counters to step the preview store through said second predetermined number of bits, one bit at a time, to determine if a proper framing pattern is identified at each step, and stopping the stepping process on such an occurrence; or if such a pattern is not found, shifting in said first predetermined number of bits in said first stage and shifting said second predetermined number of bits into said second and third stages, and then holding this condition until the beginning of the next framing interval at which time the process will again be repeated.

* * * * *